United States Patent [19]
Knutsen

[11] 3,942,657
[45] Mar. 9, 1976

[54] APPARATUS FOR UNLOADING MATERIAL SUCH AS CHIPS OR THE LIKE FROM THE BOTTOM OF A SILO

[76] Inventor: Roald Willies Knutsen, Stolsvigen, Hisoy, N-4800 Arendal, Norway

[22] Filed: Oct. 17, 1974

[21] Appl. No.: 515,612

[30] Foreign Application Priority Data
Oct. 17, 1973  Norway.............................. 4025/73

[52] U.S. Cl............................................ 214/17 DA
[51] Int. Cl.²..................................... B65G 65/46
[58] Field of Search................. 214/17 DA; 302/56; 222/404

[56] References Cited
UNITED STATES PATENTS
3,091,351  5/1963  Wellford et al................ 214/17 DA
3,817,409  6/1974  Weaver........................... 214/17 DA

*Primary Examiner*—Robert G. Sheridan
*Attorney, Agent, or Firm*—Ulle C. Linton

[57] ABSTRACT

An apparatus for unloading material such as chips or the like from the bottom of a silo, comprising a conveyer screw which at its inner end is mounted in an annular frame. The frame surrounds a central outlet opening and is rotatable about the central axis of the silo for allowing a swinging motion of the screw along the bottom of the silo. The screw is also mounted for rotation about its longitudinal axis for conveyance of material to the outlet opening, the rotation of the screw being accomplished by a drive means arranged stationary independently of the rotating frame. The power transmission for effecting the rotating and swinging motion of the conveyer screw is accomplished by a transmission means rotatably mounted in the frame, the axis of said transmission means coinciding with said central axis. The frame carries an outlet funnel having an upper opening arranged below the inner end of the screw and a lower opening arranged coaxially with the central axis. The transmission means takes the form of a ring having an inner opening adjoining the lower opening of the outlet funnel, thereby providing an unobstructed discharge of the material passed through the funnel.

One of the parts which are moving upon rotation of the screw, drives a hydraulic pump on the frame, said pump providing hydraulic pressure to a device located at the outer end of the screw for the swinging thereof.

The pump communicates with the swinging device through a conduit for hydraulic drive fluid extending through the conveyer screw.

8 Claims, 3 Drawing Figures

3,942,657

APPARATUS FOR UNLOADING MATERIAL SUCH AS CHIPS OR THE LIKE FROM THE BOTTOM OF A SILO

BACKGROUND OF THE INVENTION

The present invention relates to an apparatus for unloading material such as chips or the like from the bottom of a silo, comprising a conveyer screw which at its inner end is mounted in an annular frame, which is rotatable about the central axis of the silo and surrounds a central outlet opening, for swinging the screw along the bottom of the silo, said screw being also mounted for rotation about its longitudinal axis for conveyance of material to the outlet opening, the rotation of the screw being accomplished by a drive means arranged stationary independently of the rotating frame, the power transmission taking place via a transmission means rotatably mounted in the frame, the axis of said transmission means coinciding with said central axis.

From U.S. Pat. No. 3,050,201 there is known an unloading apparatus which comprises only one drive motor which is arranged stationary outside the parts which follow the swinging motion of the conveyer screw. This one motor gives the screw both its swinging and its rotating motion, the power transmission being effected through a drive shaft which extends centrally through the bottom of the silo. The disadvantage of such an apparatus is that the drive shaft must be mounted in a lip which extends into the outlet orifice of the silo. This entails that unloading apparatuses of this type cannot be utilized if the silo contains material such as chips or the like, as such a material will pile up on the lip and clog the outlet orifice.

In U.S. Pat. No. 3,391,809 there is disclosed an apparatus which will give the same unloading problems as described in connection with the abovementioned U.S. patent specification, as the framework which carries the rotating annular frame onto which the inner end of the conveyer screw is mounted, as well as the pipes leading to the hydraulic drive means on the frame, extend into the outlet orifice through which the material in the silo is discharged.

An apparatus according to the German accepted patent application Ser. No. 2,010,214 solves the problem of obtaining a free outlet orifice for the content of the silo, in that the bearing of the rotating frame extends around the outlet orifice, i.e. the outlet orifice and a subsequent outlet funnel are positioned inside the bearing, which is arranged at the periphery of the rotating frame. The advantages of an unobstructed outlet orifice is achieved by arranging all the drive motors on the rotating frame. However, an apparatus of this type suffers from the disadvantage that the rotating frame and thereby the screw cannot swing continuously in the same direction due to the cables for the current supply to the drive motors. The screw therefore has to sweep back and forth over the bottom of the silo, thus complicating the installation, since such a reciprocating movement requires additional control equipment. Besides, since the direction of rotation of the screw must always be the same, the feeding of the material by the screw will vary depending on whether the screw is swung back or forth. To obtain a continuous swinging movement of the screw in one direction collector ring means would be required, which means is very unfavourable in the circumstances under which the silo operates.

SUMMARY OF THE INVENTION

The object of the present invention is to provide an apparatus wherein said disadvantages are eliminated. In an apparatus of the type initially described, this is achieved in that the frame carries an outlet funnel having an upper opening arranged coaxially with the central axis, that the transmission means in the central axis takes the form of a ring having an inner opening adjoining the lower opening of the outlet funnel and provides an unobstructed discharge of the material passed through the funnel.

The operation of the swinging movement of the screw may in the apparatus according to the invention be derived from the rotating movement without locking the relation between the rotating movement and the swinging movement. Thus, one of the parts which are moving upon rotation of the screw, e.g. a rotating countershaft between the transmission means and the screw, drives a means, e.g. a hydraulic pump which provides hydraulic pressure to a device for swinging the screw. This hydraulic device may e.g. be mounted on the outer end of the screw and cooperate with the inner circumference of the silo. The screw can thereby be swung in the same direction about the central axis of the silo along the bottom thereof and take any position relatively to the central axis. The swinging and the rotating movement of the screw may be so coupled that the speed of the swinging movement tends to increase when the rotational speed of the screw increases.

Further features and advantages of the invention will appear from the claims, and an embodiment according to the invention will in the following be described with reference to the drawing.

DETAILED DESCRIPTION OF THE PREFERRED EMBODIMENT

Figure 1:
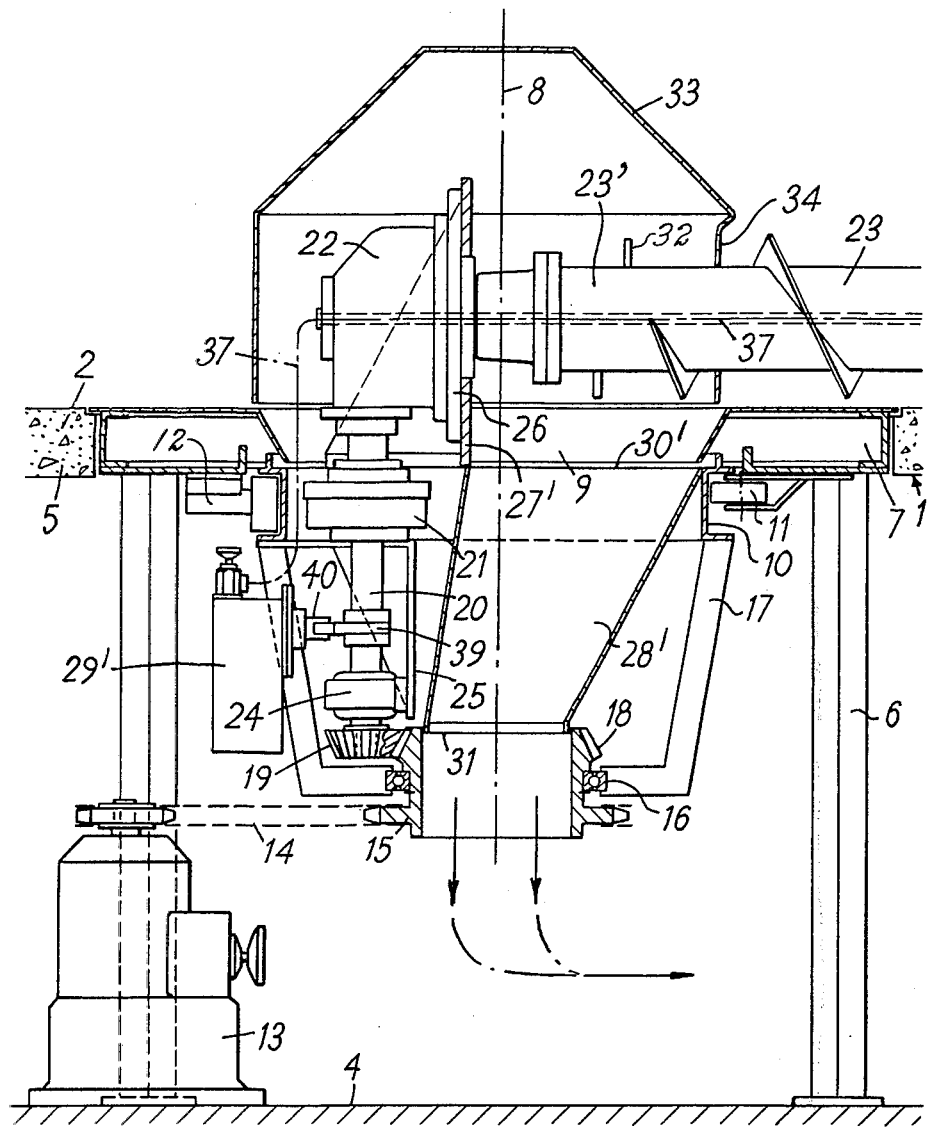
FIG. 1 is a vertical sectional view of the central part of the silo.
Figure 2:
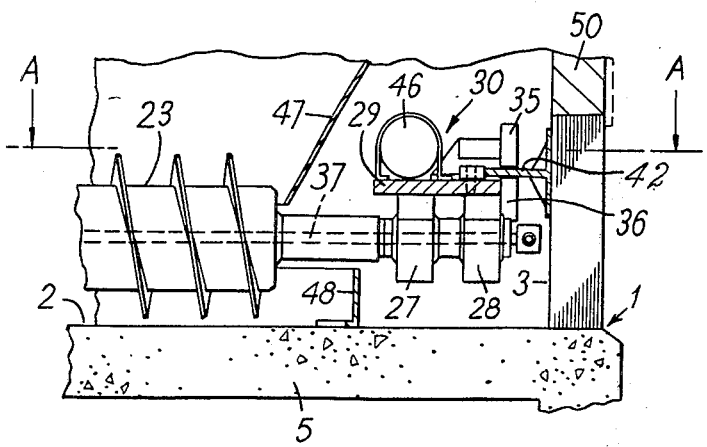
FIG. 2 is a vertical sectional view of the outer part of the silo.
Figure 3:
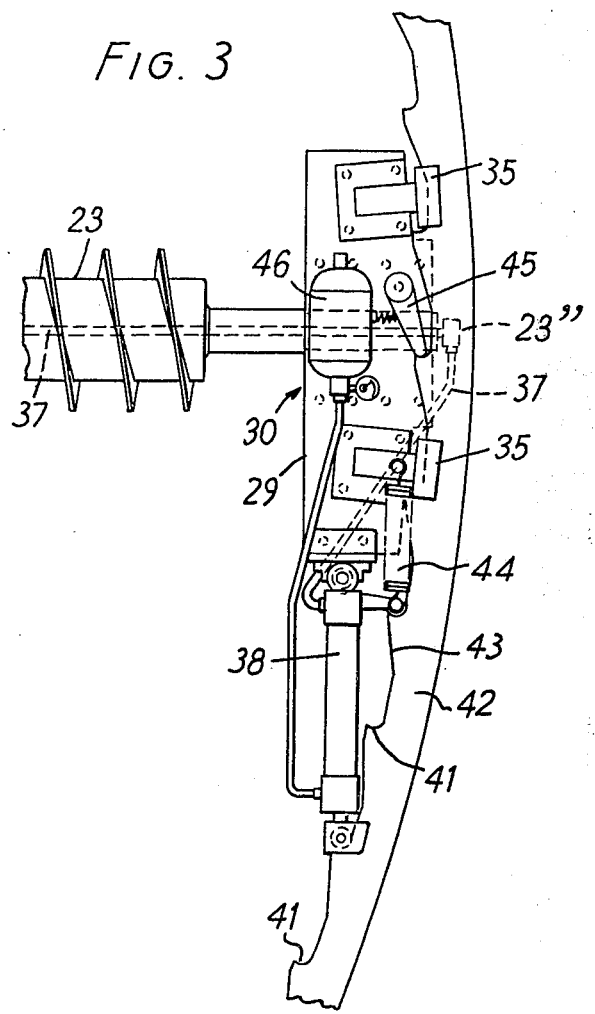
FIG. 3 is a sectional view taken along line A—A in FIG. 2.

In FIGS. 1 and 2, 1 designates the silo itself, and the bottom and walls thereof are designated by 2 and 3 respectively. On a base 4 beneath the floor 5 of the silo there is erected a framework 6 having an upper portion 7 extending through the floor 5 and having its top surface in the same plane as the bottom 2 of the silo. Centrally in the framework 6, the central axis of which coincides with the central axis 8 of the silo, there is provided a circular opening 9 in which an annular frame 10 is rotatably mounted. The frame 10 is mounted horizontally and vertically by means of horizontal and vertical rollers 11 and 12 respectively, the shafts of which are attached to the upper portion 7 of the framework. On the base 4 there is mounted a drive motor 13 with a variator which via a chain transmission 14 drives a substantially annular transmission means 15 arranged in the central axis of the silo and mounted in a bearing 16 which is carried by the rotating frame 10 by means of arms 17 depending from the frame. Along its upper, outer periphery the transmission means 15 carries a gear rim 18 which engages a gear wheel 19 on the lower end of a countershaft 20 which through a coupling means 21 and a gear wheel transmission 22 rotates a conveyer screw 23. The shaft 20 is rotatably mounted in a bearing 24 secured to the rotating frame 10 by a bracket 25. For rotation about its longitudinal axis the conveyer screw 23 is mounted at its inner end 23' in a bearing 26 and at its outer end in bearings 27 and 28. The bearings 27 and 28 are attached to a plate 29 which carries a device 30 which swings the screw 23 around the central axis 8 of the silo, and which will be described below in further detail.

To the frame 10 are also secured braces 27' for the inner bearing 26 of the conveyer screw, an outlet funnel 28', as well as a pump 29' for fluid under pressure. The outlet funnel 28' is formed as a truncated skewed cone surface. The upper opening 30' thereof is positioned in the central opening 9 of the framework 6 below the inner end 23' of the screw 23. The upper opening 30' of the outlet funnel 28' is offset from the central axis 8, whereas the lower opening 31 thereof is arranged coaxially with the central axis 8 and extends somewhat into the annular transmission means 15, the inner diameter of the transmission means being somewhat larger than the diameter of the lower opening 31 of the outlet funnel. Thereby an unobstructed discharge is provided for the material conveyed from the silo by the conveyer screw 23.

To the inner end 23' of the screw there are attached protruding ribs or studs 32 which serve the purpose of tearing apart the material conveyed by the screw 2, so that the material falls through the outlet funnel 28' and the transmission means 15 as loose mass.

Above the transmission 22 and the inner portion 23' of the screw there is provided a housing 33 which is attached to the frame 10, and which protects the central parts of the apparatus against the content of the silo 1. In the housing 33 there is provided an opening 34 through which the screw 23 extends, and through which the material can be conveyed.

The aforementioned frame 10 with its rollers 11, 12 for supporting the screw 23 at its inner end 23' serves to permit the swinging movement of the screw. Upper and lower rollers 35 and 36 support the outer end of the screw 23. The rollers 35 and 36 are mounted on the plate 29 and bear against an inwardly directed flange 42 which is secured along the inner wall 3 of the silo. The conveyer screw 23 has a central bore containing a conduit 37 for hydraulic liquid. The hydraulic conduit 37 establishes a connection between the pump 29' for hydraulic liquid and the device 30 which moves the screw 23 around the central axis 8 of the silo and along the bottom 2 thereof.

The pump 29' for hydraulic liquid mounted on the frame 10, provides the required pressure of the hydraulic liquid to actuate a cylinder 38 in the device 30 for operating the swinging movement of the screw. The pump is driven by the shaft 20 through a cam disc 39 secured thereto. Upon rotation of the shaft 20 the cam disc 39 acts upon a piston means 40 which is provided on the pump 29', and which is given a reciprocating movement according to the rotation of the shaft. The hydraulic cylinder 38 in the device 30 is operated by hydraulic liquid from the pump 29' for pressure fluid and between the pump 29' and the cylinder 38 the liquid is connected via the hydraulic conduit 37 which from the pump 29' extends through the conveyer screw 23 and is connected to the cylinder 38 via an adapter 23''.

The pressure in the conduit 37 between the pump 29' and the device 30 can be controlled by valves which are not shown. When the pressure in the conduit 37 increases, the cylinder 38 will be extended, and since it cooperates with abutment faces 41 along the inner circumference of the silo, the desired swinging movement of the screw 23 around the central axis 8 of the silo is achieved. The abutment faces 41 which are formed in the edge of the inwardly directed flange 42 on the side wall 3, are circumferentially spaced a distance which is a little shorter than the stroke which can be performed by the cylinder 38, and are interconnected via cam faces 43 which together with the abutment faces 41 form a sawtoothed circumferential face. The cylinder 38 is spring biased towards the circumferential face by means of a spring 44. A catch 45 is spring loaded towards said circumferential face, and when said catch 45 is bearing against one of the abutment faces 41, it prevents backward swinging of the screw 23 when the cylinder 38 is shortened to engage another abutment face 41.

The chamber in the cylinder 38 which by expansion effects an extension of the cylinder 38, communicates with the hydraulic conduit 37 from the pump 29', whereas the other chamber in the cylinder 38 communicates with a pressure storage chamber 46 which effects shortening of the cylinder 38 when the pressure in the conduit 37 is relieved.

A shield 47 extends around the circumference of the wall 3 of the silo and is designed so as to cover the device 30 and the outer part of the screw 23 in the lower peripheral area of the silo. Another annular shield 48 is provided on the bottom 2 of the silo and prevents material in the silo from being forced into the area where the device 30 is moving. An inspection hatch 50 is provided in the wall 3 of the silo to allow access for maintenance and inspection of the device 30.

The rotation of the screw 23 takes place independently of the position of the screw along the floor, and the screw 23 can swing continuously and in the same direction around the central axis of the silo and along the bottom 2 thereof. By rotation of the screw 23 the content of the silo is conveyed along the conveyer screw 23 and towards the inner end 23' thereof. Here, the studs 32 will tear apart the material conveyed by the screw 23, the material thus obtaining a suitable loose texture before falling through the outlet funnel 28' and through the transmission means 15. However, the swinging motion of the screw 23 is achieved by the hydraulic pressure in the conduit 37, said pressure being provided by the reciprocating motion of the piston means 40 of the pump driven by the cam disc 39 on the shaft 20 when the latter rotates.

In the disclosed embodiment the hydraulic pressure connection between the pump 29' and the cylinder 38 may be effected with variable or constant pressure. Besides the pressure by which the screw 23 is swung, also the speed of the swinging movement of the screw 23 can be adjusted, for example in relation to the height of the material in the silo 1. This adjustment may be effected manually when the drive motor 13 is shut off, but it may also be accomplished by means of radio control, if desired. Such a radio control would then require receiver equipment and relay devices adapted to the control means of the pump 29' and designed to influence the pump upon signal from a transmitter unit.

The disclosed embodiment can be varied within wide limits without exceeding the scope of the invention. For example the motive fluid for the movement of the cylinder 38 in the device 30 may be air or another suitable fluid. Further, the motive fluid of the cylinder 38 may be connected to the pump via a dual-pipe system. The pressure storage chamber 46 of the movable device 30 could then be eliminated. However, a single-pipe system for the drive fluid is, of course, simpler in many respects. Further, the power transmitting connection between the shaft 20 and the pump 29' may be constructed as a V-belt drive or a chain transmission or the like. The rotation of the annular transmission means may also be accomplished in various other ways. Thus, instead of a motor other suitable drive means may be used, and the power transmission between the drive means and the transmission means may e.g. be effected by means of V-belt or the like.

What I claim is:

1. An apparatus for unloading material such as chips or the like from the bottom of a silo, comprising a silo having a bottom outlet opening, an annular frame surrounding said outlet opening in the bottom of said silo, a conveyor screw being mounted on said frame, said frame being arranged for rotation about the central axis of said silo for allowing the swinging of said screw along the bottom of said silo, a motor mounted stationarily and independently of said rotary frame, an outlet funnel being affixed to said frame, said outlet funnel having an upper opening arranged below the inner end of said screw and a lower opening arranged coaxially with said silo central axis, transmission means being rotatably mounted in said frame and capable of effecting power transmission between said stationary motor and said rotary screw for rotating said screw about its longitudinal axis for conveying material to said outlet orifice, the axis of said transmission means coinciding with said silo central axis, said transmission means being in the form of a ring having an inner opening whose center coincides with said silo central axis and adjoining the lower opening of said outlet funnel for thereby providing an unobstructed discharge of the material passed through said funnel.

2. Apparatus as claimed in claim 1, including a countershaft eccentrically mounted on said annular frame relative to said silo central axis and operatively connected to said transmission means and one end of said screw.

3. Apparatus as claimed in claim 2, including a hydraulic pump operatively connected to said countershaft, and means capable of swinging said screw around said silo being operatively connected to said pump.

4. Apparatus as claimed in claim 3, including a conduit for hydraulic drive fluid extending from said pump through said conveyor screw and communicating with said swinging means.

5. Apparatus as claimed in claim 3, characterized in that said swinging means comprises a hydraulic cylinder which is operatively connected to said pump and cooperates with abutment faces facing in the tangential direction and being arranged along the inner circumference of said silo for providing the desired swinging motion of said screw around the central axis of said silo.

6. Apparatus as claimed in claim 5, including an inwardly facing flange being mounted on the wall of said silo and having an edge with said abutment faces thereon circumferentially spaced apart a distance which is somewhat shorter than the stroke of said cylinder, and are interconnected by cam faces which together with said abutment faces form a sawtoothed circumferential face, and said hydraulic cylinder being spring biased towards said circumferential face.

7. Apparatus as claimed in claim 6, characterized in that said swinging means includes a catch spring biased towards said circumferential face, and which, when bearing against one of the abutment faces prevent the return swinging of said screw when said cylinder is shortened to engage another abutment face.

8. Apparatus as claimed in claim 7, wherein said hydraulic cylinder has one chamber which when expanded effects extension of said cylinder and communicates with said hydraulic conduit from said pump, said cylinder has a second chamber, and a pressure storage chamber is in its communication with said cylinder second chamber to effect a shortening of said cylinder when the pressure in said conduit is relieved.

* * * * *